United States Patent
Sityon et al.

(10) Patent No.: US 9,703,834 B2
(45) Date of Patent: Jul. 11, 2017

(54) TOPOLOGICAL QUERY IN MULTI-TENANCY ENVIRONMENT

(75) Inventors: Arik Sityon, Ganne Tiqwa (IL); Assif Ziv, Beit Yitzhak (IL); Eyal Regev, Giv'atayim (IL)

(73) Assignee: Hewlett Packard Enterprise Development LP, Houston, TX (US)

(*) Notice: Subject to any disclaimer, the term of this patent is extended or adjusted under 35 U.S.C. 154(b) by 243 days.

(21) Appl. No.: 14/386,633

(22) PCT Filed: Mar. 26, 2012

(86) PCT No.: PCT/US2012/030569
§ 371 (c)(1),
(2), (4) Date: Sep. 19, 2014

(87) PCT Pub. No.: WO2013/147736
PCT Pub. Date: Oct. 3, 2013

(65) Prior Publication Data
US 2015/0120703 A1    Apr. 30, 2015

Related U.S. Application Data

(62) Division of application No. PCT/US2012/025476, filed on Mar. 21, 2012.

(51) Int. Cl.
*G06F 17/30* (2006.01)
*G06F 21/62* (2013.01)

(52) U.S. Cl.
CPC .... *G06F 17/30507* (2013.01); *G06F 21/6227* (2013.01); *G06F 2221/2141* (2013.01)

(58) Field of Classification Search
CPC .............................................. G06F 17/30507
(Continued)

(56) References Cited

U.S. PATENT DOCUMENTS

| 7,529,728 B2 | 5/2009 | Weissman et al. |
| 2004/0054690 A1* | 3/2004 | Hillerbrand ............ G06Q 10/06 |

(Continued)

FOREIGN PATENT DOCUMENTS

| CN | 101620609 A | 1/2010 |
| WO | WO-2011149453 A1 | 12/2011 |

OTHER PUBLICATIONS

Korean Intellectual Property Office, International Search Report and Written Opinion, Jan. 22, 2013, 8 pages, Daejeon Metropolitan City, Republic of Korea.

(Continued)

*Primary Examiner* — Thu-Nguyet Le

(57) ABSTRACT

Each node of a topological database that represents an information technology environment with multi-tenancy capability represents a configuration item within the environment and is characterized by a tenant authorization rule that indicates a list of tenants that are authorized to access the corresponding configuration. An unrestricted result to an unrestricted query is obtained, the unrestricted query being representable as a sub-graph isomorphism. The unrestricted result includes groups of nodes of the database that satisfy the isomorphism. A tenant query is applied to the unrestricted result to obtain an authorized result, the tenant query being representable by the same sub-graph isomorphism as the unrestricted query. The authorized result includes identification of any of the groups whose component nodes are each characterized by a TAR that authorizes access by the querying tenant. A notification is issued to the querying tenant on the basis of the obtained authorized result.

16 Claims, 5 Drawing Sheets

(58) Field of Classification Search
USPC .......................................................... 707/769
See application file for complete search history.

(56) References Cited

U.S. PATENT DOCUMENTS

| | | |
|---|---|---|
| 2005/0065925 A1 | 3/2005 | Weissman et al. |
| 2009/0016355 A1 | 1/2009 | Moyes |
| 2009/0282045 A1 | 11/2009 | Hsieh et al. |
| 2010/0005055 A1 | 1/2010 | An et al. |
| 2010/0005443 A1 | 1/2010 | Kwok et al. |
| 2010/0125612 A1 | 5/2010 | AmradKar et al. |
| 2010/0250608 A1 | 9/2010 | Malviya et al. |
| 2011/0022688 A1* | 1/2011 | Gvirtsman .............. H04L 41/22 709/220 |
| 2011/0047125 A1 | 2/2011 | Matsumoto et al. |
| 2011/0282847 A1 | 11/2011 | Collins et al. |

OTHER PUBLICATIONS

EP Office Action received in EP Application No. 12873442.3, Dec. 15, 2016, 4 pages.
Oracle, "Using Continuous Query Notification," (Web Page), 30 pages, retrieved Sep. 12, 2016 at https://web.archive.org/web/20111207000947/http://docs.oracle.com/cd/B28359_01/appdev.111/b28424/adfns_cqn.htm#autoid0.
CN First Office Action dated Nov. 1, 2016, CN Patent Application No. 201280072423.3 dated Mar. 26, 2012, State Intellectual Property Office of the P.R. China, 6 pages.

* cited by examiner

TOPOLOGICAL QUERY IN MULTI-TENANCY ENVIRONMENT

PRIORITY APPLICATION INFORMATION

This application is a 371 National Stage Entry Application of PCT/US2012/030569 filed on Mar. 26, 2012, which claims priority to and is a Divisional of International Application No. PCT/US2012/025476 filed on Mar. 21, 2012. The contents of which are incorporated herein by reference in its entirety.

BACKGROUND

Managed service providers (MSPs) and other network or cloud oriented information technology (IT) outsourcing organizations provide computing services to client users via a network. A client that subscribes to such a service may access the various computing services and resources to which that client subscribes. In this manner, a subscribing client may be able to access significant computing resources, which, due to the expense and expertise required to maintain those resources, could otherwise be unavailable to the client. For example, a business that is starting up, or which prefers not to employ technical staff, would be able to access computing resources without the delay or expense that may be entailed by assembling in-house resources.

An MSP may provide concurrent access to resources to a large number of client users. Resources, such as a hardware device or database, may be shared among several clients. Each client user of an MSP or other cloud oriented IT organization may be restricted to access only those parts (e.g. hardware, software, service) of the IT network that are relevant to that client. Access is provided in such a manner that each client is unaware of other clients of the MSP.

A configuration management database (CMDB) may be used to model shared resources that are made available by the MSP. A CMDB may model the resources, for example, using virtualization. With virtualization, the MSP IT environment is modeled such that an abstracted virtual computing platform is presented to each client. Components are modeled as accessible by the client only in abstracted virtual form. In other cases, a cloud oriented IT organization may be modeled using a multi-instance approach in which a separate instance of a topological database is created for each client.

A cloud oriented IT organization may be modeled using a multi-tenancy approach. In a multi-tenancy approach, various clients, or tenants, are enabled to access a modeled single shared resource (instance) or shared information.

BRIEF DESCRIPTION OF THE DRAWINGS

Examples of topological querying in a multi-tenancy environment may best be understood by reference to the following detailed description when read with the accompanied drawings in which.

DETAILED DESCRIPTION

Figure 1:
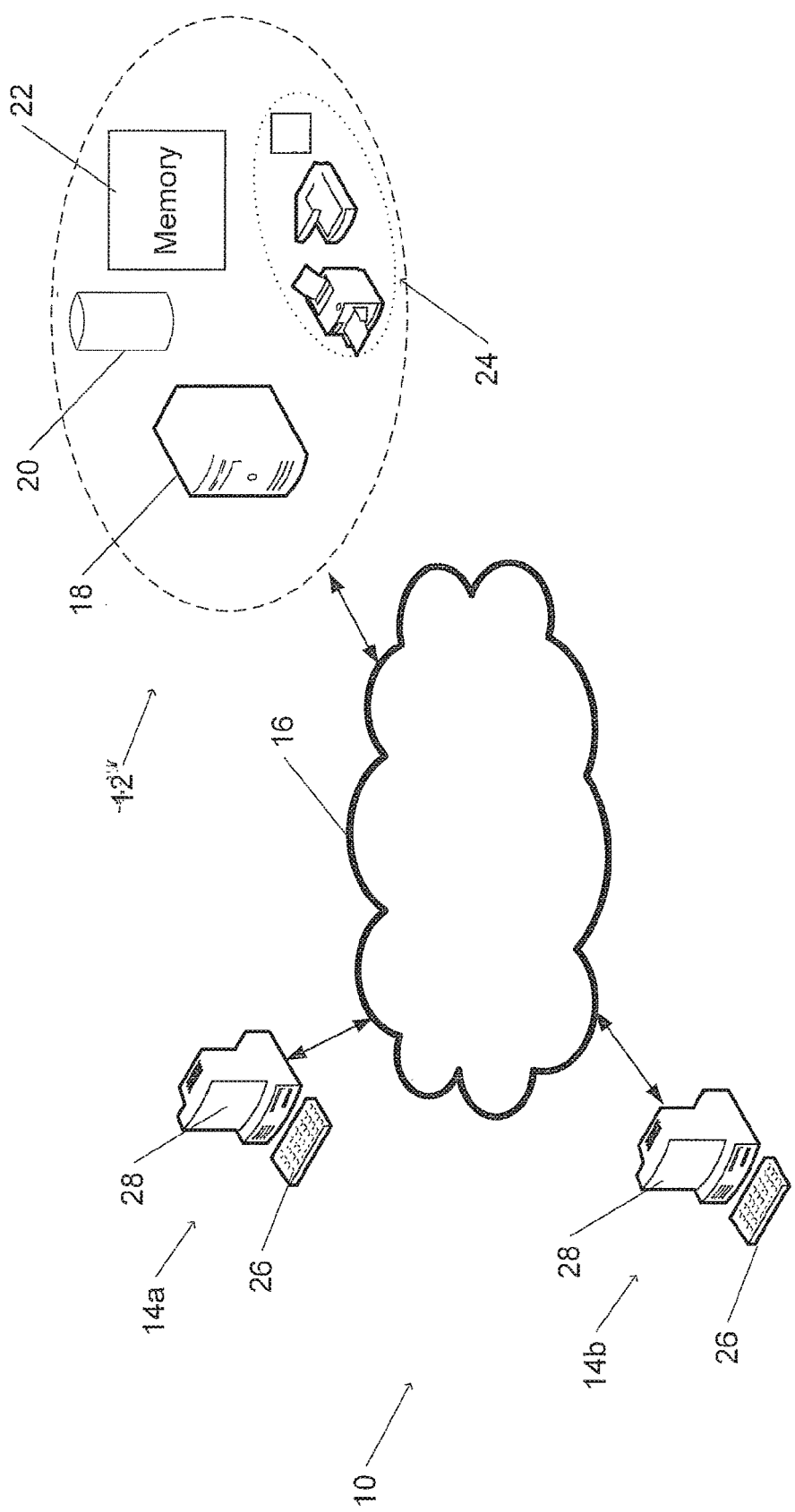
FIG. 1 is a schematic illustration of a system for application of an example of topological querying in a multi-tenancy environment.

In accordance with an example of topological querying in a multi-tenancy environment, a multi-tenancy environment may be in the form of a topological database that supports multi-tenancy or includes a multi-tenancy capability. The topological database may represent an information technology (IT) environment. The topological database may include configuration items that represent hardware or software items that are associated with the IT environment. For example, configuration items may represent a set of resources that are provided by a managed service provider (MSP), or individuals that participate in a social network. The topological database may be in the form of a configuration management database (CMDB). As another example, a multi-tenancy topological database may be used to model a social or other network of clients with access to various resources of an environment. Any such network may be referred to herein as an IT environment.

For example, the IT environment or MSP may include a collection of resources that may be made available to a tenant (e.g. authorized user or client, such as an organization) of the MSP. A configuration item may represent a resource such as hardware (e.g. processor, data storage device, printer, or scanner), software (e.g. application, program, or database), a business service (e.g. accounting, management, or banking), or other resource of a MSP or other network or cloud-based IT outsourcing organization. Each client user, or tenant, of the MSP, may be authorized to access a subset of the configuration items. (A tenant may be in the form of an organization with various users, sometimes herein referred to as subtenants, which may access a subset of the configuration items to which the tenant is authorized to access.) An administrator system of the MSP, on the other hand, may be authorized to access all configuration items of the IT environment (or a subset that is larger than that to which single tenants of a group of tenants are each authorized to access). For example, an administrator may represent a user of the administrator system who is authorized to access a wider range of resources than a single tenant, or an administrator of an entire MSP or IT environment who is authorized to access all resources. If a single resource has different levels of access (e.g. read only, or read and write), such different levels may be considered to be different resources for the purpose of this description.

A topological database, such as a topological database representing an IT environment or MSP, may be visually represented as a directed graph of nodes. Each node of the graphical representation of the topological database (sometimes herein referred to as a node of the topological database for the sake of brevity) represents a configuration item. A directed connecting edge between two nodes may then represent a relationship between the two nodes. For example, one node of the topological database may represent a host computer, while another represents a database. An arrow from the node that represents the host to a node that represents the database may indicate that the host is configured to access the database.

The configuration item that is represented by a node of the topological database may be characterized by one or more properties. One such property is a set (which may be empty) of tenants that are authorized to access the configuration item that is represented by the node. Such a property is herein referred to as a tenant authorization rule (TAR). Other properties may define a class of configuration items to which the configuration item that corresponds to a node belongs (e.g. type of hardware or software configuration item to which a node corresponds).

The topological database may be queried. A query to the topological database may be represented in the form of an isomorphism of a component of the graph, herein referred to as a sub-graph isomorphism. For example, a sub-graph isomorphism may include a collection of nodes of particular types that are interconnected in a particular manner. A returned result of the query includes any sub-groups of nodes of the topological database whose types and interconnections match those of the query. A query may be qualified by properties or characteristics of the nodes of the sub-graph isomorphism. Such characteristics may include, for example, authorized access by a particular tenant or set of tenants.

The results of a query may be stored or saved. The stored or saved results may be accessed or queried at a later time.

The topological database may be queried on a one-time basis, such a query being herein referred to as an ad hoc query. For example, an ad hoc query may be initiated by a user that is associated with one or more tenants (each such tenant being herein referred to as a querying tenant). Such a query may, for example, request a listing of all groups of particular combinations of configuration items (nodes) of the multi-tenancy environment whose component configuration items have a defined (by the query) relationship between one another (representable as a sub-graph isomorphism). Since the ad hoc query is initiated by a user that is associated with the querying tenant, the returned results are limited to a listing of only those groups of configuration items to whose component configuration items the querying tenant is authorized to access.

In the case of an ad hoc query initiated by a user associated with the querying tenant, the ad hoc query may be qualified by conditions regarding the TAR that characterizes each node. For example, the query may be automatically qualified by an administrator system of the topological database (e.g. of a CMDB). The additional qualification may limit results to those groups of nodes wherein each component node is characterized by a TAR that authorizes access by the querying tenant (or several querying tenants in the case that a user is associated with several tenants). In this manner, the user does not receive any result to the query that includes a configuration item to which access by that user is not authorized.

The topological database may be queried repeatedly on an ongoing basis (e.g. periodically). Such an ongoing query is herein referred to as an active query. For example, an active query may be initiated by an administrator of the topological database (e.g. of a CMDB). Such an active query may, for example, continually monitor all groups of particular combinations of configuration items (nodes) of the multi-tenancy environment whose component configuration items have a defined (by the query) relationship between one another (the query being representable as a sub-graph isomorphism). The results of an active query may be stored or saved.

A user that is associated with a tenant (herein referred to as a subscribing tenant) may subscribe to an active query, or register to be notified of changes to the results of the active query. By subscribing to the active query, the user indicates a request to receive notification of any changes to results of the active query that affect the subscribing tenant (or a plurality of subscribing tenants when the user is associated with such a plurality of subscribing tenants). When a change in a result of the active query result is detected (automatically) by an administrator system, the administrator system of the topological database (e.g. of a CMDB) may (automatically) report the change to a user that is associated with an affected subscribing tenant. Each user is informed only of those changes that affect those configuration items to which access by the associated subscribing tenant is authorized. In the case of an active query, a result of the active query that is returned to the administrator (system) may include many groups of nodes that satisfy the sub-graph isomorphism. However, a particular subscribing tenant may not be authorized to access the entire result, or receive notifications regarding the entire set of changes.

Prior to reporting results to that particular subscribing tenant, those nodes which that subscribing tenant is authorized to access are identified. For example, a saved result of an active query may be queried for a particular subscribing tenant. A result of the subscribing tenant query may include those groups among the identified nodes that satisfy the sub-graph isomorphism of the active query. This may be described as application of an appropriate hierarchal filter to the saved results of the active query to select those groups of nodes to which access by the particular subscribing tenant is authorized, and which satisfy the sub-graph isomorphism of the active query. The configuration items that correspond to the selected groups of nodes, or a subset of the groups of configuration items (e.g. only those of the groups that represent a change from a previously reported active query result) may be reported to that tenant.

Such hierarchal topological querying in a multi-tenancy environment may be advantageous. For example, in accordance with another possible approach, a separate query would be generated for each tenant that subscribes to the active query (e.g. similar to the approach used for an ad hoc query by the subscribing tenant). A different result would then be generated for each tenant that subscribes to the active query. For example, such an approach, could, however, present a large burden on resources (e.g. computational or storage space) of an MSP. Creating a new query with such an approach could become a cumbersome task since each active query would be adapted to every tenant (or group of tenants).

Figure 2:
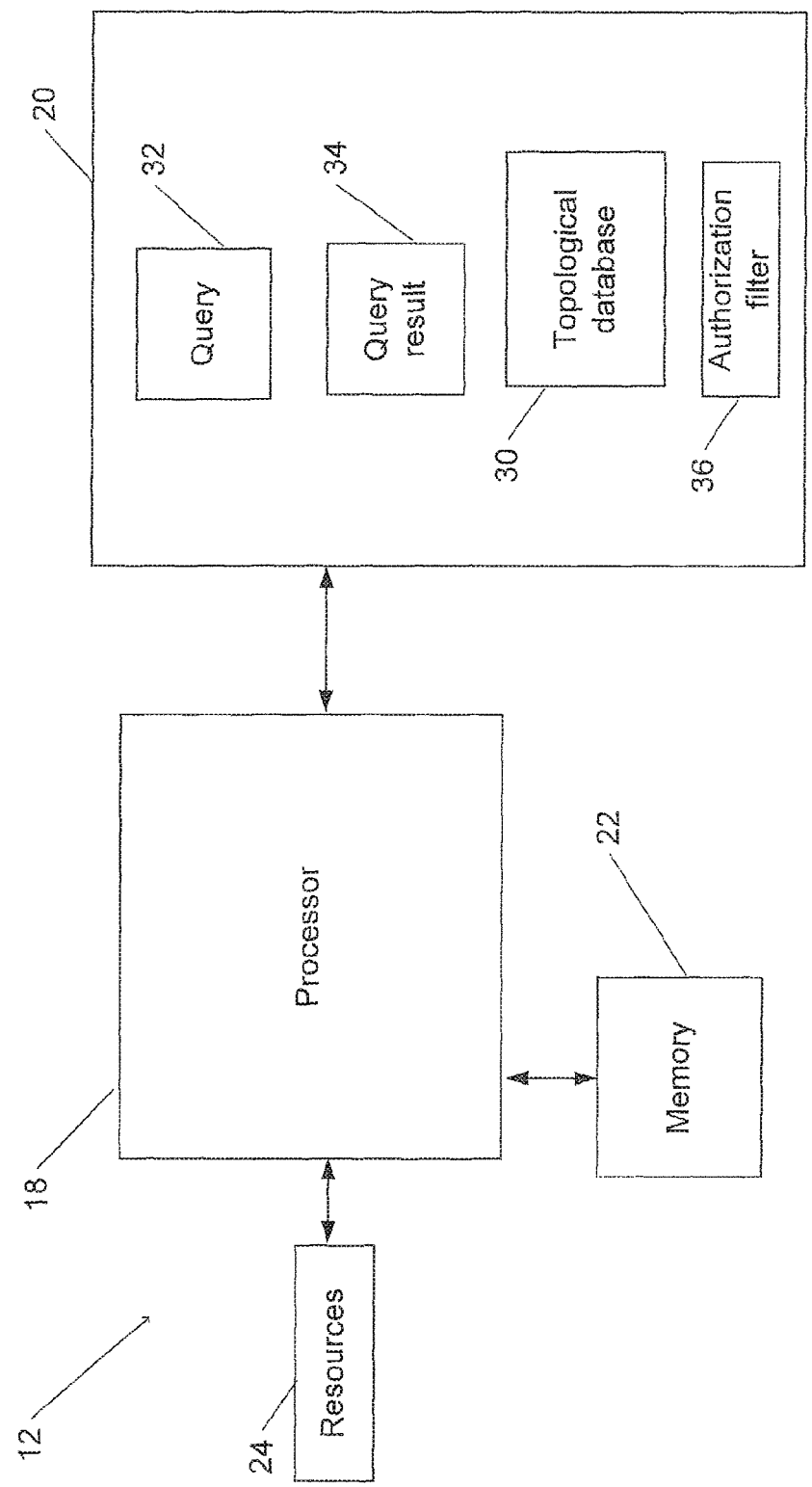
FIG. 2 is a schematic illustration of an administrator system for the system illustrated in FIG. 1.

FIG. 1 is a schematic illustration of a system for application of an example of topological querying in a multi-tenancy environment. Multi-tenancy IT environment 10 includes administrator system 12. FIG. 2 is a schematic illustration of an administrator system of the system illustrated in FIG. 1.

Administrator system 12 may provide resources to tenants 14a and 14b (for the sake of simplicity only two tenants are shown, although there could be many more). Administrator system 12 may communicate with tenants 14a and 14b via network 16. For example, network 16 may represent a network that is associated with administrator system 12.

Each tenant 14a or 14b may include an input device 26. For example, an input device 26 may include a keyboard, keypad, pointing device, or other device that may be operated by a user in order to input data, such as data that defines an ad hoc query.

Each tenant 14a or 14b may include an output device 28. For example, an output device 28 may include a computer monitor or screen or other device (e.g. a printer, display panel, speaker, or another device capable of producing visible, audible, or tactile output) that may be operated to communicate data to a user, such as data that results from execution of a query.

Administrator system 12 may include a processor 18. For example, processor 18 may include one or more processing units, e.g. of one or more computers. Processor 18 may be configured to operate in accordance with programmed instructions stored in memory 22. Processor 18 may be capable of executing an application for topological querying in a multi-tenancy IT environment.

Processor 18 may communicate with memory 22. Memory 22 may include one or more volatile or nonvolatile memory devices. Memory 22 may be utilized to store, for example, programmed instructions for operation of processor 18, data or parameters for use by processor 18 during operation, or results of operation of processor 18. For example, memory 22 may be used to store data that is related to a topological database, a query to the topological database, or a result of a query to the topological database.

Processor 18 may communicate with data storage device 20. Data storage device 20 may include one or more fixed or removable nonvolatile data storage devices. For example, data storage device 20 may include a computer readable medium for storing program instructions for operation of processor 18. It is noted that storage device 20 may be remote from processor 18. In such cases storage device 20 may be a storage device of a remote server storing a program for operation of processor 18 in the form of an installation package or packages that can be downloaded and installed for execution by processor 18. Data storage device 20 may be utilized to store data or parameters for use by processor 18 during operation, or results of operation of processor 18.

Processor 18 may communicate with MSP resources 24. For example, MSP resources 24 may include various hardware and software resources.

MSP resources 24 may be represented by topological database 30. Topological database 30 may be stored in data storage device 20, in memory 22, or both. For example, topological database 30 may be stored in the form of a digital representation of a directed graph of connected nodes.

A query 32 may be stored in data storage device 20, in memory 22, or both. For example, query 32 may represent an ad hoc query or an active query. Query 32 may be executed on topological database 30 by processor 18.

Execution of query 32 may result in query result 34. For example, a result of an active query may be stored as query result 34 in data storage device 20; in memory 22, or both.

Prior to reporting a query result 34 to a tenant 14a or 14b, processor 18 may apply authorization filter 36 to query result 34. Authorization filter 36 may select data from query result 34, e.g. on the basis of data in topological database 30, for reporting to tenant 14a or 14b via network 16. The selected data may include those query results that the destination tenant is authorized to access.

(In FIG. 2, topological database 30, query 32, query result 34, and authorization filter 36 are shown, for simplicity, as stored in data storage device 20 only. However, any of topological database 30, query 32, query result 34, or authorization filter 36 may be stored, at least some of the time, in memory 22).

MSP resources 24 of administrator system 12 may be represented by a topological database 30.

Figure 3A:
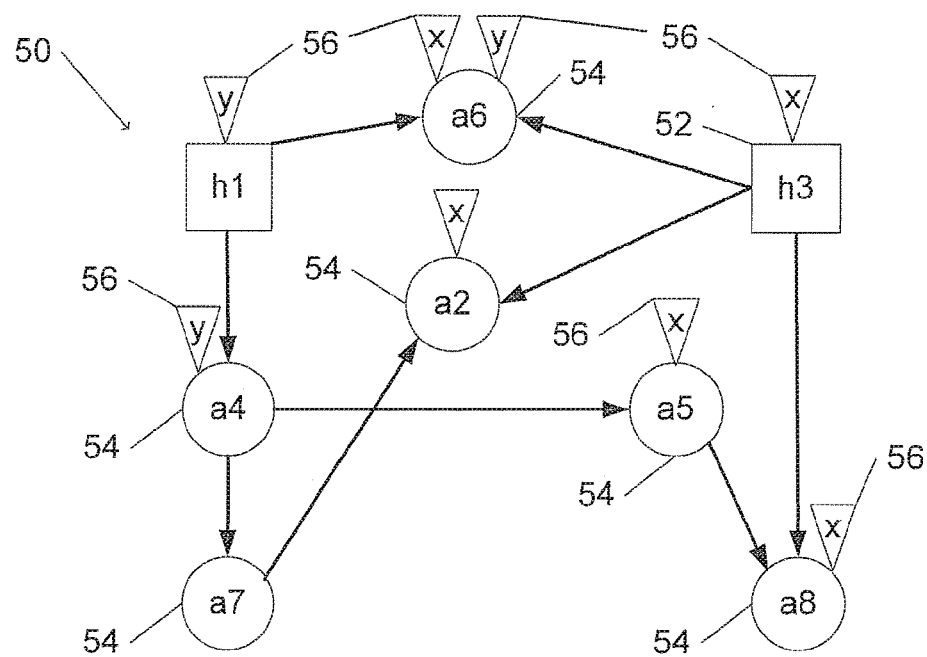
FIG. 3A is a graphical illustration of an example of a topological database that represents resources of an managed service provider (MSP)

FIG. 3A is a graphical illustration of an example of a topological database that represents resources of an MSP. For the sake of simplicity, topological database 50 as represented in FIG. 3A is includes only two types of nodes two tenants (designated "x" and "y").

In topological database 50 is shown in the form of a directed graph of nodes. Nodes h1 and h3, each representing a host resource 52, are shown as squares. Nodes, a2, a4, a5, a6, a7, and a8, each representing an application resource 54, are shown as circles. For example, a directed edge (arrow) from a host resource 52 to an application resource 54 (e.g. from node h1 to node a4) may represent that that application resource 54 (e.g. corresponding to node a4) is configured to run on that host resource 52 (e.g. corresponding to node h1). Similarly, a directed edge from a first application resource 54 to a second application resource 54 may represent (e.g. from node a7 to node a2) may represent that the first application resource 54 (e.g. corresponding to node a7) is configured to call, or otherwise cause to execute, the second application resource 54 (e.g. corresponding to node a2). Note, for example, that host resource 52 that is represented by node h3 is shown as being configured to run three application resources 54 that are represented by node a2, node a6, and node a8. The application resource 54 that is represented by node a8 is configured to run on the host resource 52 that is represented by node h3, and to be called by the application resource 54 that is represented by node a5.

A TAR for each MSP resource of topological database 50 is indicated by a letter corresponding to a node is indicated by a triangular tag that is attached to the corresponding node. In the illustrated example, the TAR of each of nodes a2, h3, a5, a6, and a8 indicates that tenant x is authorized to access that node. Similarly, the TAR of each of nodes h1, a4, and a6 indicates that tenant y is authorized to access that node. Note that the TAR of node a6 indicates that both tenant x and tenant y are authorized to access node a6.

Figure 3B:
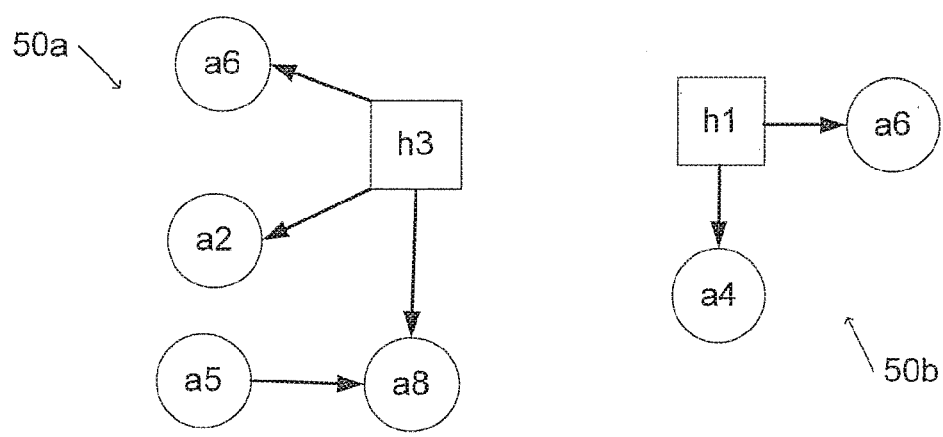
FIG. 3B illustrates which nodes of the topological database illustrated in FIG. 3A are accessible by each tenant.

FIG. 3B illustrates which nodes of the topological database illustrated in FIG. 3A are accessible to each tenant. The nodes of subset 50a of topological database 50 are available to tenant x. Similarly, the nodes of subset 50b of topological database 50 are available to tenant y.

A query may be performed on topological database 50. A query to topological database 50 may be represented by a sub-graph isomorphism of topological database 50.

Figure 4A:
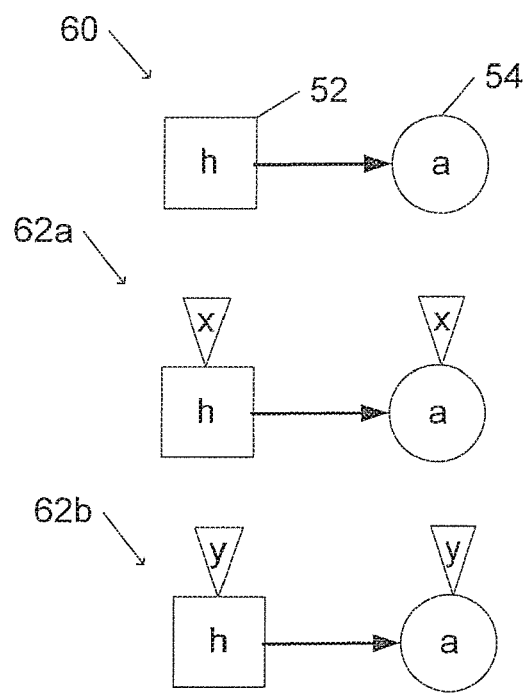
FIG. 4A schematically illustrates formulation of queries to the topological database illustrated in FIG. 3A.
Figure 4B:
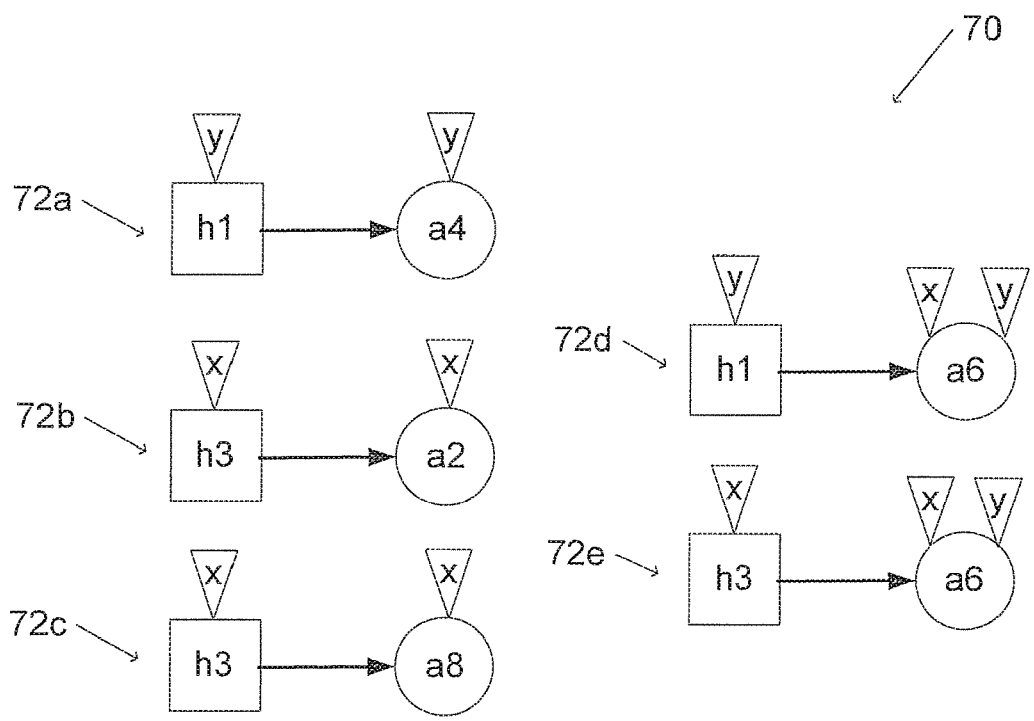
FIG. 4B schematically illustrates results to the queries illustrated in FIG. 4A.

FIG. 4A schematically illustrates formulation of queries to the topological database illustrated in FIG. 3A. FIG. 4B schematically illustrates results to the queries illustrated in FIG. 4A.

For example, sub-graph isomorphism 60 may represent a query to topological database 50. Sub-graph isomorphism 60 is shown as representing any host that runs any application.

When sub-graph isomorphism 60 is applied to topological database 50 as shown, the unrestricted result 70 may be returned. (The term "unrestricted result" is used herein to refer to a result that could include a node to which a tenant under discussion is not authorized to access, and not necessarily without any authorization restrictions. A query that results in an unrestricted result as defined above is herein referred to as an unrestricted query.) Unrestricted result 70 includes all representations of any host resource 52 that runs an application resource 54. However, unrestricted result 70 may only be accessible to an administrator of topological database 50 (or a user associated with a tenant with less restricted access than either tenant x or tenant y). Neither tenant x nor tenant y is authorized to access all of unrestricted result 70. Thus, unrestricted result 70 may not be reported as is to either tenant x or tenant y. Unrestricted result 70 may be returned to a querying administrator and stored by the administrator for later use.

In the event that sub-graph isomorphism 60 represents an ad hoc query that is submitted by a (user that is associated with a) querying tenant, the query represented by sub-graph isomorphism 60 may be modified by incorporating a TAR-related condition into the query. For example, the tenant may submit the ad hoc query via an administrator system of topological database 50. The administrator system may then modify the query before submitting the query to topological database 50.

For example, if the querying tenant is tenant x, sub-graph isomorphism 60 may be modified to the form of sub-graph isomorphism 62a. Sub-graph isomorphism 62a represents any host that tenant x is authorized to access that runs any application that tenant x is also authorized to access. Applying the query that is represented by sub-graph isomorphism 62a to topological database 50 returns authorized result 72b, authorized result 72c, and authorized result 72e.

Similarly, if the querying tenant of the submitted ad hoc query is tenant y, sub-graph isomorphism 60 may be modified to the form of sub-graph isomorphism 62b. Sub-graph isomorphism 62b represents any host that tenant y is authorized to access that runs any application that tenant y is also authorized to access. Applying the query that is represented by sub-graph isomorphism 62b to topological database 50 returns authorized result 72a and authorized result 72d.

A query represented by sub-graph isomorphism 62a or by sub-graph isomorphism 62b may be submitted to an administrator system after unrestricted result 70 had already been returned and saved by the administrator system. For example, unrestricted result 70 may have been returned in response to an active query that was submitted by the administrator system in the form of sub-graph isomorphism 60. As another example, unrestricted result 70 may have resulted from an ad hoc query that was submitted by a user associated with a tenant that is authorized to access all of the resources to which both tenant x and tenant y are authorized to access (e.g. if tenants x and y represent separate subdivisions of an organization that has subscribed to resources from an MSP, or if the previous query was submitted by a tenant that subscribed to a wider variety of resources than either tenant x or tenant y).

In this case, when, for example, a user associated with tenant x submits a query to the administrator system as represented by sub-graph isomorphism 62a, the administrator may apply the submitted query to unrestricted result 70. Authorized result 72b and authorized result 72c may then be returned. Similarly, if a user associated with tenant y submits a query to the administrator system as represented by sub-graph isomorphism 62b, the administrator system may apply the submitted query to unrestricted result 70. Authorized result 72a may then be returned. If unrestricted result 70 does not exist (e.g. the query represented by sub-graph isomorphism 60 had not yet, or recently, been submitted to topological database 50), unrestricted result 70 may first be generated (e.g. if more such queries are expected to be submitted by other querying tenants in the future). Such creation of an unrestricted query result only when necessary may be referred to as "lazy creation."

In some cases, a user associated with a tenant may subscribe to, or register for, an active query so as to be informed of any changes in the environment that is represented by topological database 50. For example, if node a2 is removed from topological database 50, authorized result 72b will no longer appear in a modified unrestricted result. Upon submission of queries to the modified unrestricted result, a change may be detected in the authorized results for tenant x, but not in those for tenant y. Thus, a notification of the change (deletion of authorized result 72b) may be sent to a user associated with tenant x, but not to a user associated with tenant y.

Such an arrangement of querying may be considered hierarchal. For example, unrestricted result 70 may be considered to be at the top of a hierarchy. Authorized results 72a through 72c may be considered to represent a lower tier or level of the hierarchy. Similarly, a third tenant (e.g. a subtenant of tenant x) may be authorized to access a subset of the resources to which tenant x is authorized to access. The third tenant may be considered to represent at a level of the hierarchy that is below that of authorized results 72b and 72c. When the third tenant submits a query, the query may be applied to authorized results 72b and 72c, to which tenant x is authorized to access.

If the definition of an active query or a tenant authorization is changed, the definition of the hierarchies may be updated. A user who is associated with a specific set of tenants may register for notifications with regard to an active query. If that user's associated set of tenants is changed, the hierarchy for that user may change without affecting other hierarchies created with regard to the active query, and without affecting other users registered for notifications from this active query.

Such hierarchal querying of a higher level query result may be more efficient than querying the full topological database. For example, the higher level query result may be much smaller than the full topological database. Thus, fewer memory or processing resources may be used with hierarchal querying than would be required with direct querying of the topological database.

Such hierarchal querying of a higher level query result may be more efficient than storing a separate data set for each tenant (comparable to multi-customer architecture). Since overlap between different tenants may be substantial, such storing of separate data could result in data duplication, which could consume extra data storage space and result in increased processing. Such storing of separate tenant data would not enable assigning multiple tenants to a single resource, or subtenants to a single tenant.

In operation, processor 18 (FIG. 1) may execute a method for topological querying in a multi-tenancy environment.

Figure 5:
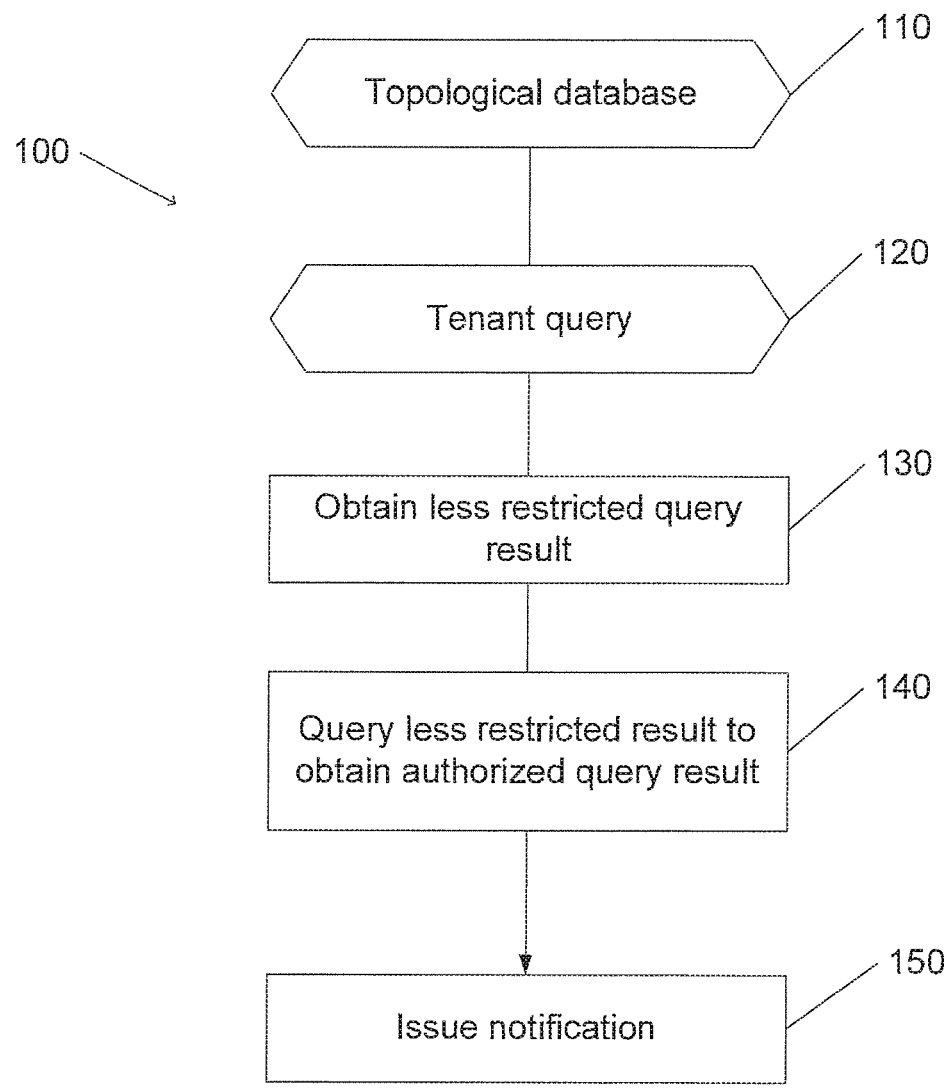
FIG. 5 is a flowchart depicting an example of a method for topological querying in a multi-tenancy environment.

FIG. 5 is a flowchart depicting an example of a method for hierarchal topological querying in a multi-tenancy environment. In the example of FIG. 5, hierarchal query method 100 may be executed by a processor of a system for topological querying in a multi-tenancy environment. Hierarchal query method 100 may be executed upon a request or command that is issued by a tenant user, by an administrator, or automatically issued by another application that is associated with the tenant or the administrator. Various component operations of hierarchal query method 100 may be initiated at different times, or in response to different circumstances.

It should be understood with respect to the flowchart that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other examples of the illustrated method.

Similarly, it should be understood that, unless indicated otherwise, the illustrated order of execution of the operations represented by blocks of the flowchart has been selected for convenience and clarity only. Operations of the illustrated method may be executed in an alternative order, or concurrently, with equivalent results. Such reordering of operations of the illustrated method should be understood as representing other examples of the illustrated method.

In accordance with an example of hierarchal topological querying in a multi-tenancy environment, a computer program application stored in a computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as an example of a method for hierarchal topological querying in a multi-tenancy environment. The computer-readable medium may be a non-transitory computer-readable media including all forms and types of computer-readable media except for a transitory, propagating signal.

Hierarchal query method 100 may be performed on a topological database (block 110). A topological database may represent, for example, resources of, and relationships between resources of, an MSP. When represented in graphical form, nodes of the topological database may represent MSP resources and connecting edges may represent relationships.

Hierarchal query method 100 may be performed when results are required to a query on behalf of a tenant of a multi-tenancy environment that is represented by the topological database (block 110). For example, tenant query may be in the form of a tenant that is subscribing to, or registered for, a service that informs the tenant of results (or changes in results) of an active query by an administrator. In another example, the tenant query may be in the form of an ad hoc query that originates with the tenant but that is common to (or is anticipated to be common to) a larger group of tenants.

The tenant on whose behalf the query is made may not be authorized to access all nodes of the topological database. For example, a tenant representing an organization that subscribes to an MSP may be authorized to access only a subset of the resources that an administrator of the MSP is authorized to access. Thus, a query by the administrator represents a higher level of a hierarchal query than does a query on behalf of the tenant. Similarly, a subtenant of the tenant (e.g. a division of an organization that subscribes to an MSP) may be authorized to access only a subset of the nodes (e.g. MSP resources) to which the tenant is authorized to access. Thus, a query on behalf of the subtenant may represent a lower level of the hierarchal query than does a query on behalf of the tenant.

Thus, a result of a higher level query, representing a less restricted result than a result that the tenant may be authorized to access, may be obtained (block 130). When available, a stored less restricted, or unrestricted, query result may be accessed in a memory or storage device that is associated, e.g. with an administrator of the environment that is represented by the topological database. For example, a result of an active query by the administrator, or of a query by the administrator in response to an ad hoc query by another tenant, may have been previously stored. If no such stored query result is available but generating such a less restricted result is indicated (e.g. the same query is likely to be submitted by other tenants), a higher level query may be submitted and the less restricted result obtained. (If obtaining a less restricted result is not indicated, e.g. in the case of a submitted ad hoc query that is not likely to be repeated, the submitted query may be restricted by incorporation of a TAR and applied to the entire topological database.) For example, a stored previously returned less restricted result may be deleted from storage if during a predetermined period of time (or number of operations) no tenant queries were applied to the less restricted result.

The tenant query may be applied to the obtained less restricted result so as to obtain a more restricted (authorized) query result (block 140). For example, a stored unrestricted result of an active query by an administrator may be queried for results that match the tenant query (e.g. in the form of a sub-graph isomorphism with a restriction to nodes to which the querying tenant is authorized to access). A returned authorized query result includes those groups of nodes (e.g. configuration items or resources of an MSP) whose relationships correspond to those of the query, and to which the querying tenant is authorized to access.

In the event that another tenant is authorized to access the same nodes as the querying tenant, and that a query for the other tenant had been previously submitted and authorized results returned and saved, that saved result may be returned as the authorized query result to the current querying tenant.

In the event that the tenant is registered to receive updates with regard to an active query by the administrator, the tenant query may be applied to the less restricted result only when a change is detected in the less restricted result.

The querying tenant may receive a notification that is based on authorized query result (block 150). For example, a list of the groups of nodes that are included in the authorized query result may be sent or otherwise communicated to the querying tenant. In some cases, e.g. after an initial authorized query result was previously reported to the querying tenant, only changes in the authorized query result may be reported. In the event that no changes in the authorized query result are detected, no report may be made, or the fact that no changes were detected may be reported.

We claim:

1. A method comprising:
    accessing a topological database with multi-tenancy capability that represents an information technology environment, each node of the topological database representing a configuration item within the environment, each node being characterized by a tenant authorization rule (TAR) that indicates a list of tenants of the topological database that are authorized to access the configuration item that corresponds to that node;
    obtaining an unrestricted result to an unrestricted query, the unrestricted query being representable as a first sub-graph isomorphism, the unrestricted result to the unrestricted query including any groups of the nodes of the topological database that satisfy the first sub-graph isomorphism;
    modifying the unrestricted query by incorporating a TAR condition into the unrestricted query to create a modified query;
    applying the modified query to the unrestricted result to obtain an authorized result, the modified query being representable by a second sub-graph isomorphism that is substantially of the same form as the first sub-graph isomorphism representation of the unrestricted query, the authorized result including identification of any of the groups whose component nodes are each characterized by a TAR that authorizes access by the querying tenant; and
    issuing a notification on the basis of the obtained authorized result.

2. The method of claim 1, wherein the information technology environment comprises a managed service provider (MSP), and wherein each configuration item represents a resource of the MSP.

3. The method of claim 1, wherein obtaining the unrestricted result comprises repeatedly submitting an active query to the database.

4. The method of claim 3, wherein the modified query is applied to the unrestricted result when a change is detected in the unrestricted results obtained from successive submissions of the active query.

5. The method of claim 1, comprising comparing the obtained authorized result with a previously obtained authorized result.

6. The method of claim 5, wherein the issuing the notification comprises indicating a difference between obtained authorized result and the previously obtained authorized result.

7. The method of claim 1, wherein applying the modified query comprises applying the modified query to a stored unrestricted result.

8. The method of claim 1, comprising:
receiving a user query submitted by a user; and
determining that a related unrestricted result does not exist for the user query.

9. A non-transitory computer readable medium having stored thereon instructions that when executed by a processor will cause the processor to:
receive a tenant query to a topological database with multi-tenancy capability from a tenant of topological database, wherein each node of the topological database represents a configuration item within an information technology environment, each node being characterized by a tenant authorization rule (TAR) that indicates a list of those tenants that are authorized to access the configuration item that corresponds to that node, and wherein the tenant query is representable as a first sub-graph isomorphism of the topological database;
obtain an unrestricted result to an unrestricted query to the topological database, a second sub-graph isomorphism of the unrestricted query having substantially the same form as the first sub-graph isomorphism of the tenant query, the unrestricted result including any groups of the nodes of the topological database that satisfy the second sub-graph isomorphism of the unrestricted query;
modifying the unrestricted query by incorporating a TAR into the unrestricted query to create a modified tenant query;
apply the modified tenant query to the obtained unrestricted result to obtain an authorized result, the authorized result including identification of any of the groups whose component nodes are each characterized by a TAR that authorizes access by the tenant; and
issue a notification on the basis of the obtained authorized result.

10. The non-transitory computer readable medium of claim 9, wherein the environment comprises a managed service provider MSP), and wherein each configuration item comprises a resource of the MSP.

11. The non-transitory computer readable medium of claim 9, wherein the instruction to obtain the unrestricted result comprises instruction to retrieve a stored result of the unrestricted query.

12. The non-transitory computer readable medium of claim 9, wherein the instruction to obtain the unrestricted result comprises instruction to submit the unrestricted query to the topological database.

13. The non-transitory computer readable medium of claim 12, wherein the instruction to submit the unrestricted query comprises instruction to repeatedly submit an active query to the topological database and to store the unrestricted result.

14. The non-transitory computer readable medium of claim 13, wherein the instruction to apply the modified tenant query to the obtained unrestricted result comprises instructions to apply the modified tenant query when a change is detected in the unrestricted result.

15. The non-transitory computer readable medium of claim 9, comprising instructions to compare the obtained authorized result with a previously obtained authorized result.

16. The non-transitory computer readable medium of claim 15, wherein the notification to the tenant comprises an indication of a difference between the obtained authorized result and a previously obtained authorized result.

* * * * *